US012413897B2

(12) United States Patent
Linghu et al.

(10) Patent No.: US 12,413,897 B2
(45) Date of Patent: Sep. 9, 2025

(54) COAXIAL SPEAKER

(71) Applicant: AAC Microtech (Changzhou) Co., Ltd., Jiangsu (CN)

(72) Inventors: Ronglin Linghu, Changzhou (CN); Yun Tang, Changzhou (CN); Bo Xiao, Changzhou (CN); Wei Song, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 239 days.

(21) Appl. No.: 18/324,124

(22) Filed: May 25, 2023

(65) Prior Publication Data

US 2024/0284092 A1 Aug. 22, 2024

Related U.S. Application Data

(63) Continuation of application No. PCT/CN2023/076317, filed on Feb. 16, 2023.

(51) Int. Cl.

| | |
|---|---|
| ***H04R 1/24*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/24* (2013.01); *H04R 1/025* (2013.01); *H04R 7/04* (2013.01); *H04R 7/18* (2013.01); *H04R 9/025* (2013.01); *H04R 9/045* (2013.01); *H04R 9/063* (2013.01); *H04R 2400/11* (2013.01)

(58) Field of Classification Search

CPC . H04R 1/24; H04R 1/025; H04R 7/04; H04R 7/18; H04R 9/025; H04R 9/045; H04R 9/063; H04R 2400/11

See application file for complete search history.

(56) References Cited

U.S. PATENT DOCUMENTS 3,772,466 A * 11/1973 Hossbach ............ H04R 1/2834 381/396

6,343,128 B1 * 1/2002 Coffin ...................... H04R 9/06 381/186

(Continued)

*Primary Examiner* — Oyesola C Ojo

(74) *Attorney, Agent, or Firm* — Wiersch Law Group

(57) ABSTRACT

The present invention provides a coaxial speaker including a fixing member, a magnetic circuit system, a voice coil, a first vibration system connected with the voice coil, and a second vibration system connected with the voice coil and arranged surrounding the first vibration system. The second vibration system locates coaxially with the first vibration system. The first vibration system includes a first diaphragm and a first support connecting the first diaphragm and the voice coil. The second vibration system includes a second diaphragm and a second support connecting the second diaphragm and the voice coil. The first diaphragm is used for generating treble sound. The second diaphragm is used for generating bass sound. Bass sound and treble sound form a full-range speaker, providing high-quality sound. Moreover, the assembly process is simplified by sharing voice coil, which improves assembly efficiency and reduces costs.

8 Claims, 4 Drawing Sheets

(56) References Cited

U.S. PATENT DOCUMENTS

| | | | | |
|---|---|---|---|---|
| 6,714,656 | B1 * | 3/2004 | Coffin | H04R 9/02<br>381/420 |
| 8,831,270 | B1 * | 9/2014 | Dimitrov | H04R 1/30<br>381/401 |
| 10,631,096 | B1 * | 4/2020 | Garcia Selva | H04R 9/06 |
| 2011/0176703 | A1 * | 7/2011 | Horigome | H04R 1/2842<br>381/412 |
| 2014/0056465 | A1 * | 2/2014 | Li | H04R 9/025<br>381/400 |
| 2014/0241566 | A1 * | 8/2014 | Choi | H04R 9/043<br>381/400 |
| 2015/0237449 | A1 * | 8/2015 | Papp | H04R 7/02<br>381/398 |
| 2020/0275189 | A1 * | 8/2020 | Cho | H04R 7/16 |
| 2025/0008269 | A1 * | 1/2025 | Zhang | H04R 9/045 |

* cited by examiner

COAXIAL SPEAKER

FIELD OF THE PRESENT INVENTION

The present invention relates to the field of electro-acoustic devices, and more particularly to a coaxial speaker.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction. The sound source of the treble unit and bass unit of the coaxial speaker can also be located in front and back of the coaxial speaker respectively, that is, the two speaker units sounding along different directions.

In related art, the treble unit and bass unit of the coaxial speaker usually each includes an independent vibration system and an independent magnetic circuit system, and the structure of the coaxial speaker is complex. Because the coaxial speaker is consisted of the treble unit and the bass unit coaxially, the overall size of coaxial speaker is increased, which resulting in inconvenient installation and reduced the suitability of the product.

Therefore, it is desired to provide a new coaxial speaker which can overcome the above problems.

SUMMARY

In view of the above, the embodiments of the present invention provide a new coaxial speaker. By the present invention, the assembly structure of coaxial speaker is simple and the cost is reduced.

The present invention provides a coaxial speaker including a fixing member having a receiving room, a magnetic circuit system mounted with the fixing member and having a magnetic gap, a voice coil at least partially located into the magnetic gap, a first vibration system connected with the voice coil, and a second vibration system connected with the voice coil and arranged surrounding the first vibration system. The second vibration system locates coaxially with the first vibration system. The first vibration system includes a first diaphragm and a first support connecting the first diaphragm and the voice coil. The second vibration system includes a second diaphragm and a second support connecting the second diaphragm and the voice coil. The first diaphragm is used for generating treble sound. The second diaphragm is used for generating bass sound.

As an improvement, the second diaphragm is closer to the magnetic circuit system than the first diaphragm.

As an improvement, the first support includes a first fixing portion with an annular shape connecting to the voice coil, a connecting portion extending inwardly from the first fixing portion, and a second fixing portion extending from the connecting portion toward the first diaphragm and connected to the first diaphragm.

As an improvement, the second diaphragm includes a first suspension with an annular hollow shape, a first dome surrounding the first suspension, and a second suspension partially surrounding the first dome, the second fixing portion of the first support passing through the first suspension and connected to the first diaphragm.

As an improvement, the second support has an annular shape, one end of the second support connected with the first dome, and the other end of the second support connected to with the voice coil.

As an improvement, one end of the second support distal to the second diaphragm is connected to the first fixing portion of the first support so that the first fixing portion is sandwiched between the second support and the voice coil.

As an improvement, the coaxial speaker further includes a supporting member connecting the first diaphragm to the second diaphragm, the supporting member including a first portion located out of the receiving room of the fixing member and a second portion located in the receiving room, the first portion connected with the first diaphragm, the second portion connected with the second diaphragm, a size of the second portion smaller than the size of the first portion.

As an improvement, the coaxial speaker further includes a first housing covered above the first diaphragm, a first sound hole is provided on the first housing for sounding the treble sound generated by the first diaphragm.

As an improvement, the fixing member includes a frame secured to the magnetic circuit system, a supporting ring secured to the second diaphragm, and a second housing mounted with the supporting ring, the second housing covering the second diaphragm and spaced apart from the supporting member to form a second sound hole for sounding the bass sound generated by the second diaphragm.

As an improvement, the second portion of the supporting member extends to and fix with the magnetic circuit system.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
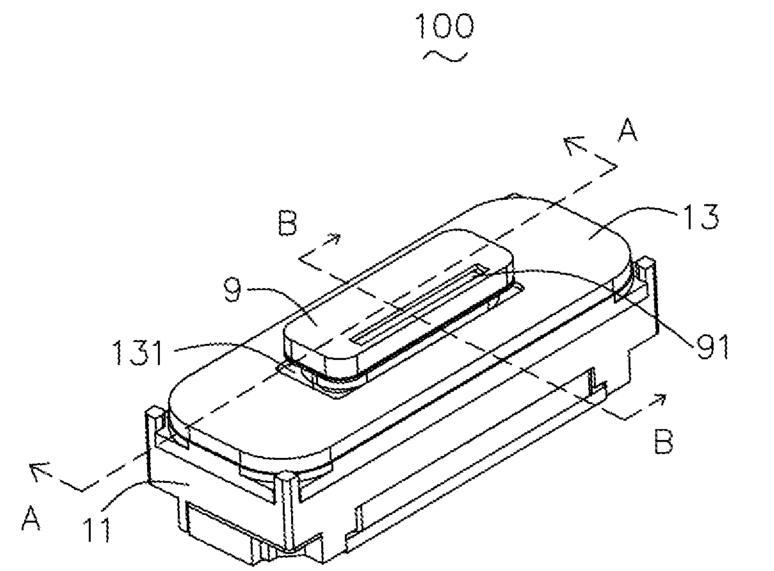
FIG. 1 is an illustrative isometric view of a coaxial speaker in accordance with one embodiment of the present invention.
Figure 2:
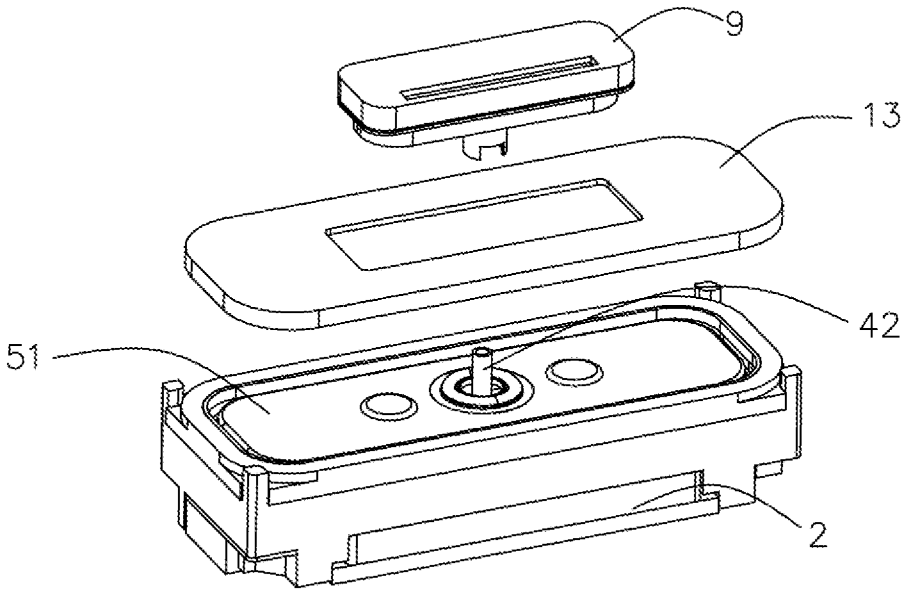
FIG. 2 is a partially exploded view of the coaxial speaker of FIG. 1.
Figure 3:
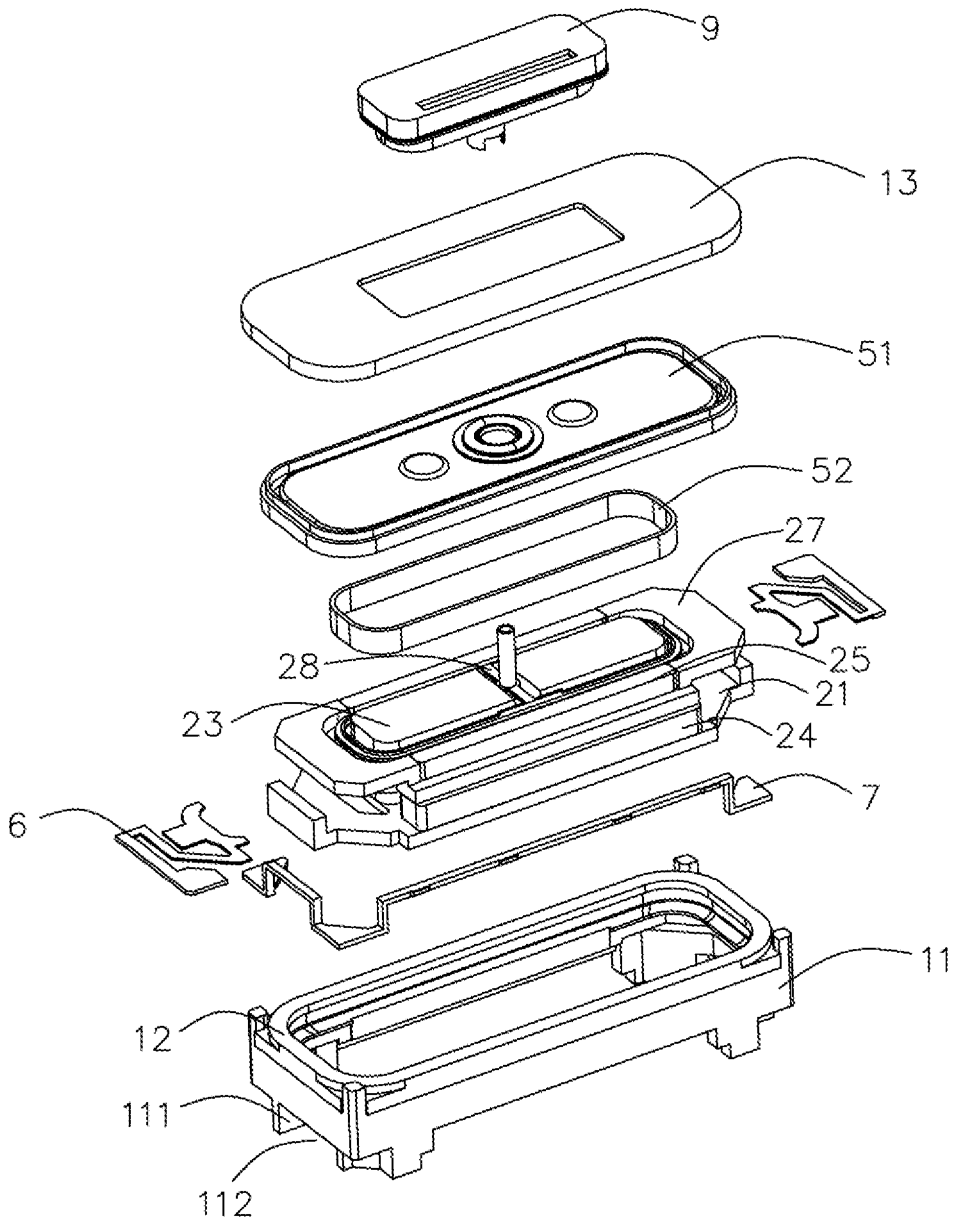
FIG. 3 is another partially exploded view of the coaxial speaker of FIG. 1.
Figure 4:
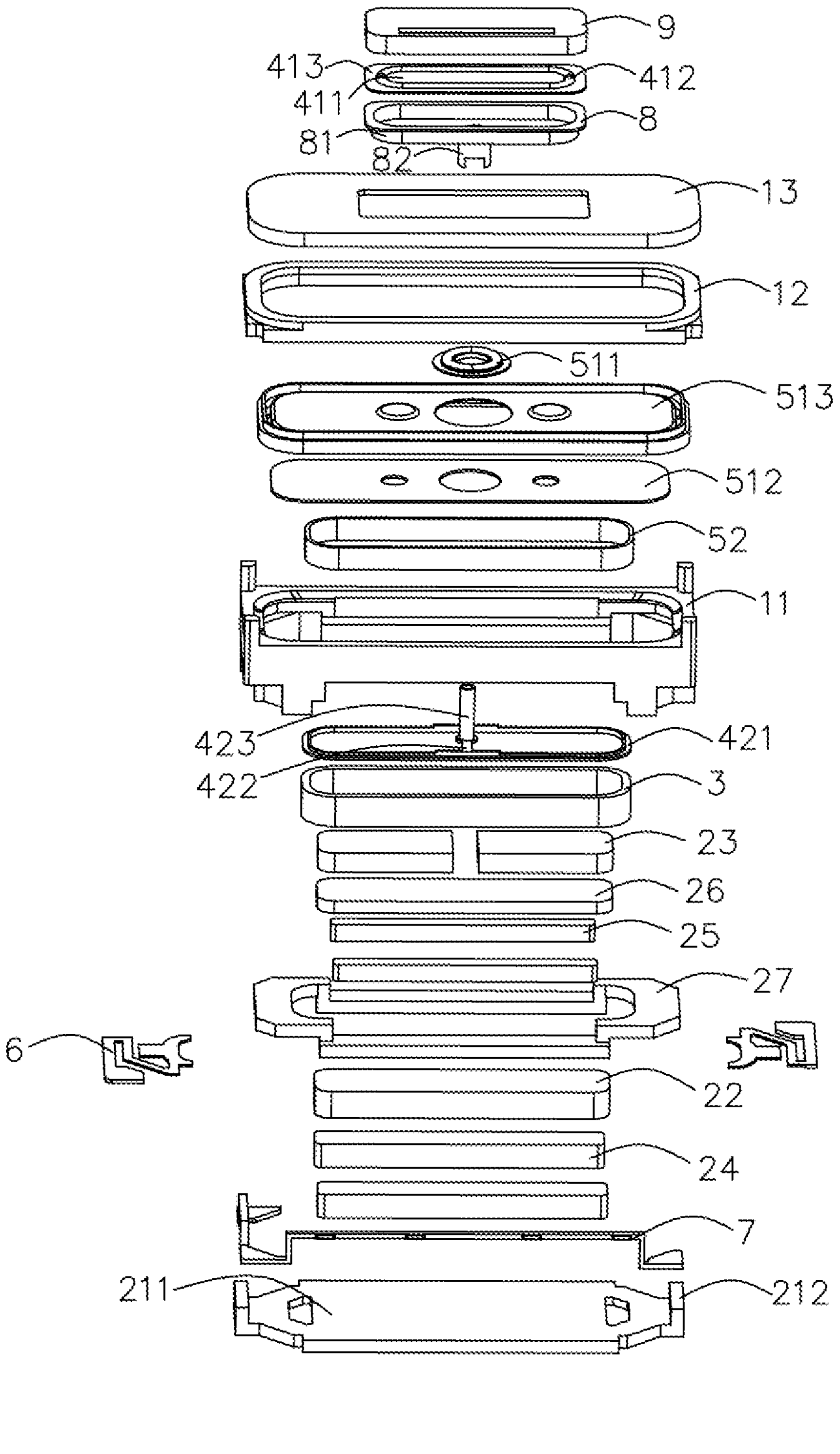
FIG. 4 is an exploded view of the coaxial speaker of FIG. 1.
Figure 5:
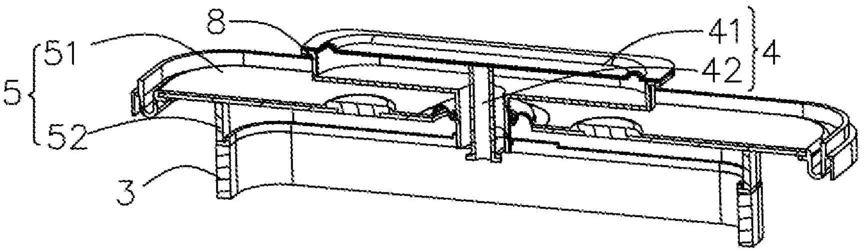
FIG. 5 is an illustrative cross-sectional view of some members of the coaxial speaker taken along line A-A of FIG. 1.
Figure 6:
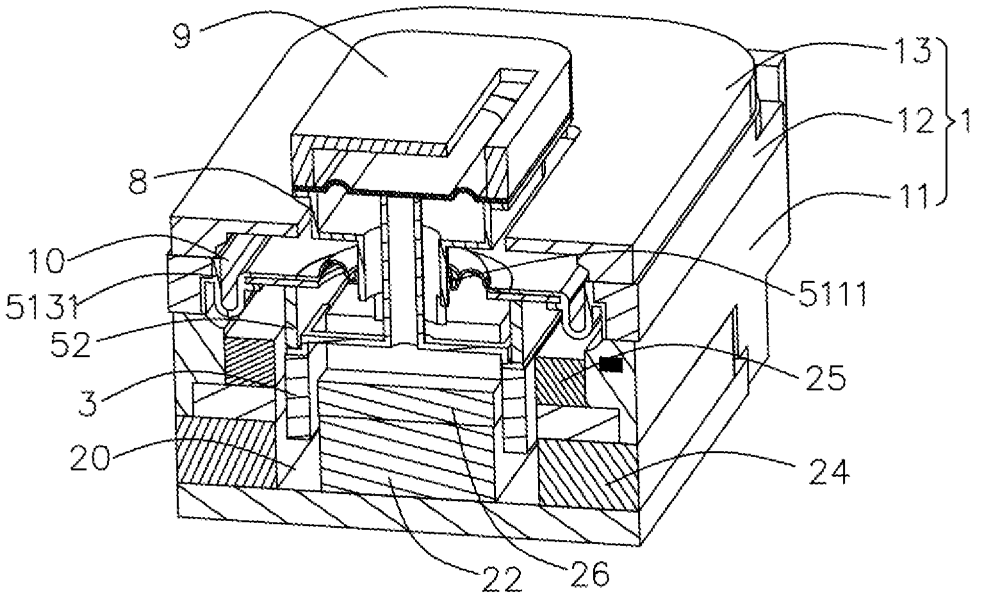
FIG. 6 is an illustrative cross-sectional view of the coaxial speaker taken along line B-B of FIG. 1.

Referring to the FIGS. 1-6, the embodiment of the present invention provides a coaxial speaker 100. The coaxial speaker 100 includes a fixing member 1 having a receiving room 10, a magnetic circuit system 2 mounted with the fixing member 1 and having a magnetic gap 20, a voice coil 3 at least partially located into the magnetic gap 20, a first vibration system 4 connected with the voice coil 3, a second vibration system 5 connected with the voice coil 3 and arranged surrounding the first vibration system 4, a printed circuit board 6 powering for the voice coil 3, a welding piece 7, a supporting member 8 connecting the first vibration system 4 and the second vibration system 5, and a first housing 9 covered above the first vibration system 4. The second vibration system 5 locates outside the first vibration system 4 and arranged coaxially with the first vibration system 4. In present embodiment, the coaxial speaker 100 is a rectangle, and in other embodiments, the coaxial speaker 100 may also be circular or other shapes.

The fixing member 1 includes a frame 11 secured to the magnetic circuit system 2, a supporting ring 12 secured to the second vibration system 5, and a second housing 13 mounted with the supporting ring 12. The frame 11 is a rectangular annular structure, and the four corners of the frame 11 are provided with a supporting leg 111, and an accommodating portion 112 is formed between each adjacent supporting leg 111. The supporting ring 12 is annular and sandwiched between the frame 11 and the second housing 13.

The magnetic circuit system 2 includes a magnetic bowl 21, a first main magnet 22 disposed on the magnetic bowl 21, a pair of second main magnets 23 stacked on the first main magnet 22, a plurality of first auxiliary magnets 24 spaced apart from the first main magnet 22, a plurality of second auxiliary magnets 25 stacked on the first auxiliary magnets 24, a main pole plate 26 sandwiched between the first main magnet 22 and the second main magnets 23, and an auxiliary pole plate 27 sandwiched between the first auxiliary magnets 24 and the second auxiliary magnets 25. The first main magnet 22, the main pole plate 26, and the second main magnets 23 are disposed stacked and form the magnetic gap 20 with the stacked structure of the first auxiliary magnets 24, the auxiliary pole plate 27, and the second auxiliary magnets 25. The magnetic bowl 21 includes a carrying part 211 carrying the magnets and an extending part 212 bending and extending from the carrying part 211. The extending part 212 is received in the accommodating portion 112 of the frame 1 in a direction of a short axis of the coaxial speaker 100. The first auxiliary magnets 24 are received in the accommodating portion 112 of the frame 1 in a direction of a long axis of the coaxial speaker 100.

The first main magnet 22, the second main magnets 23, the first auxiliary magnets 24, and the second auxiliary magnets 25 are magnetized in a vibration direction of the coaxial speaker 100. And the first main magnet 22 and the second main magnets 23 are set opposite each other with a same pole, that is, the first main magnet 22 and the second main magnets 23 are magnetized in opposite directions. The first auxiliary magnets 24 and the second auxiliary magnets 25 are also set opposite each other with a same pole. Furthermore, the first main magnet 22 and the first auxiliary magnets 24 are magnetized in opposite directions. In this embodiment, the number of the second main magnet 23 is two, and both of the two second magnets are stacked on the first main magnet 22. An avoiding portion 28 is formed between the two second main magnets 23. The auxiliary pole plate 27 has a ring structure.

The first vibration system 4 includes a first diaphragm 41 and a first support 42 connecting the first diaphragm 41 and the voice coil 3. The first diaphragm 41 is used for generating treble sound. The sound direction of the first diaphragm 41 is upward along the vibration direction. The first diaphragm 41 is an integrated structure, and the first diaphragm 41 includes a dome portion 411, a suspension portion 412 surrounding the dome portion 411, and a fixation portion 413 surrounding the suspension portion 412. The first support 42 includes a first fixing portion 421 with an annular shape connecting to the voice coil 3, a connecting portion 422 extending inwardly horizontally from the first fixing portion 421, and a second fixing portion 423 extending from the connecting portion 422 toward the first diaphragm 41 and connected to the first diaphragm 41. The second fixing portion 423 is a hollow tubular structure. The connecting portion 422 connects the first fixing portion 421 and a second fixing portion 423 along a short axis direction of the coaxial speaker 100. The avoiding portion 28 formed between the two second main magnets 23 provide the avoiding space for the connecting portion 422.

The second vibration system 5 includes a second diaphragm 51 and a second support 52 connecting the second diaphragm 51 and the voice coil 3. The second diaphragm 51 is used for generating bass sound. The sound direction of the second diaphragm 51 is upward along the vibration direction. The second diaphragm 51 is closer to the magnetic circuit system 2 than the first diaphragm 41. The second diaphragm 51 is a separate structure, and the second diaphragm 51 includes a first suspension 511 with an annular hollow shape, a first dome 512 surrounding the first suspension 511, and a second suspension 513 partially surrounding the first dome 512. The first suspension 511 includes a first attaching portion 5111 attached fixed to the supporting member 8. The second suspension 513 includes a second attaching portion 5131 attached fixed to the supporting ring 12. An outer end portion of the first suspension 511 is abutted against an inner end portion of the second suspension 513. The first dome 512 is attached to and under the first suspension 511 and the second suspension 513. The second fixing portion 423 of the first support 42 passes through the first suspension 511 and connects to the first diaphragm 41. The second support 52 has an annular shape, and one end of the second support 52 is connected with the first dome 512, and the other end of the second support 52 is connected to with the voice coil 3. In detail, the end of the second support 52 distal to the second diaphragm 51 is connected with the first fixing portion 421 of the first support 42, so that the first fixing portion 421 is sandwiched between the second support 52 and the voice coil 3.

The second housing 13 covers the second diaphragm 51 and is spaced apart from the supporting member 8 to form a second sound hole 131 for sounding the bass sound generated by the second diaphragm 51.

In this embodiment, the number of the printed circuit board 6 is two, and each printed circuit board 6 is arranged in the direction of the short axis of the coaxial speaker 100. One end of the printed circuit board 6 is secured to the frame 11, and the other end of the printed circuit board 6 elastically supports the voice coil 3.

The welding piece 7 is injected into the frame 11 to electrically connect the printed circuit board 6 with an external circuit.

The supporting member 8 connects the first diaphragm 41 to the second diaphragm 51. The supporting member 8 includes a first portion 81 located out of the receiving room 10 of the fixing member 1 and a second portion 82 located in the receiving room 10. The first portion 82 is connected with the first diaphragm 41, and the second portion 82 is connected with the second diaphragm 51. A size of the second portion 82 is smaller than the size of the first portion

81, and the second portion 82 extends to fix with the second main magnets 23 of the magnetic circuit system 2.

The first housing 9 covers above the first diaphragm 41 and is mounted with the fixation portion 413 of the first diaphragm 41. A first sound hole 91 is provided on the first housing 9 for sounding the treble sound generated by the first diaphragm 41.

The treble and the bass units of the present invention share the magnetic circuit system, and at the same time, they share the voice coil to drive the bass support (named the second support) and the treble support (named the first support) to realize the driving of the diaphragm system (named the first diaphragm and the second diaphragm) simultaneously. The FO of the treble sound can be controlled between 2 kHz~6 kHz, and the Qts>2.

The coaxial speaker of the present invention can be applied to wearable products, such as watches, and there are two application modes: the treble unit realizes the remote SOS function, and the treble and bass unit realize the voice calls and music playback.

Comparing with the related art, in the coaxial speaker of present invention, the coaxial speaker including a fixing member having a receiving room, a magnetic circuit system mounted with the fixing member and having a magnetic gap, a voice coil at least partially located into the magnetic gap, a first vibration system connected with the voice coil, and a second vibration system connected with the voice coil and arranged surrounding the first vibration system. The second vibration system locates coaxially with the first vibration system. The first vibration system includes a first diaphragm and a first support connecting the first diaphragm and the voice coil. The second vibration system includes a second diaphragm and a second support connecting the second diaphragm and the voice coil. The first diaphragm is used for generating treble sound. The second diaphragm is used for generating bass sound.

The coaxial speaker of the present invention arranges an annular bass vibration system for providing bass sound, a treble vibration system disposed surrounded by the bass vibration system for providing treble sound. Bass sound and treble sound form a full-range speaker, providing high-quality sound. Moreover, the assembly process of the coaxial speaker is simplified by sharing voice coil, which improves assembly efficiency and reduces costs. The two diaphragms share the voice coil and magnetic circuit system to further reduce costs and improve acoustic performance.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a fixing member having a receiving room;

a magnetic circuit system mounted with the fixing member and having a magnetic gap;

a voice coil at least partially located into the magnetic gap;

a first vibration system connected with the voice coil, the first vibration system comprising:

a first diaphragm, the first diaphragm used for generating treble sound; and a first support connecting the first diaphragm and the voice coil; and a second vibration system connected with the voice coil and arranged surrounding the first vibration system, the second vibration system located coaxially with the first vibration system, the second vibration system comprising:

a second diaphragm, the second diaphragm used for generating bass sound, the second diaphragm being closer to the magnetic circuit system than the first diaphragm; and a second support connecting the second diaphragm and the voice coil;

a supporting member connecting the first diaphragm to the second diaphragm, the supporting member comprising a first portion located out of the receiving room of the fixing member and a second portion located in the receiving room, the first portion connected with the first diaphragm, the second portion connected with the second diaphragm, a size of the second portion smaller than the size of the first portion.

2. The coaxial speaker as described in claim 1, wherein the first support comprises a first fixing portion with an annular shape connecting to the voice coil, a connecting portion extending inwardly from the first fixing portion, and a second fixing portion extending from the connecting portion toward the first diaphragm and connected to the first diaphragm.

3. The coaxial speaker as described in claim 2, wherein the second diaphragm comprises a first suspension with an annular hollow shape, a first dome surrounding the first suspension, and a second suspension partially surrounding the first dome, the second fixing portion of the first support passing through the first suspension and connected to the first diaphragm.

4. The coaxial speaker as described in claim 3, wherein the second support has an annular shape, one end of the second support connected with the first dome, and the other end of the second support connected to with the voice coil.

5. The coaxial speaker as described in claim 4, wherein one end of the second support distal to the second diaphragm is connected to the first fixing portion of the first support so that the first fixing portion is sandwiched between the second support and the voice coil.

6. The coaxial speaker as described in claim 1, wherein the coaxial speaker further comprises a first housing covered above the first diaphragm, a first sound hole is provided on the first housing for sounding the treble sound generated by the first diaphragm.

7. The coaxial speaker as described in claim 1, wherein the fixing member comprises a frame secured to the magnetic circuit system, a supporting ring secured to the second diaphragm, and a second housing mounted with the supporting ring, the second housing covering the second diaphragm and spaced apart from the supporting member to form a second sound hole for sounding the bass sound generated by the second diaphragm.

8. The coaxial speaker as described in claim 1, wherein the second portion of the supporting member extends to fix with the magnetic circuit system.

* * * * *